A. W. WIGGLESWORTH.
SELF OILING PULLEY.
APPLICATION FILED JULY 13, 1908.
980,579.
Patented Jan. 3, 1911.
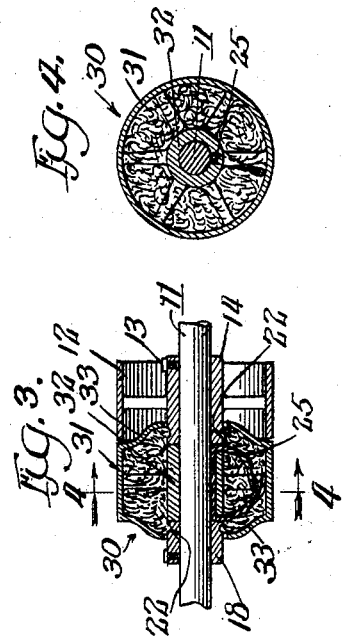
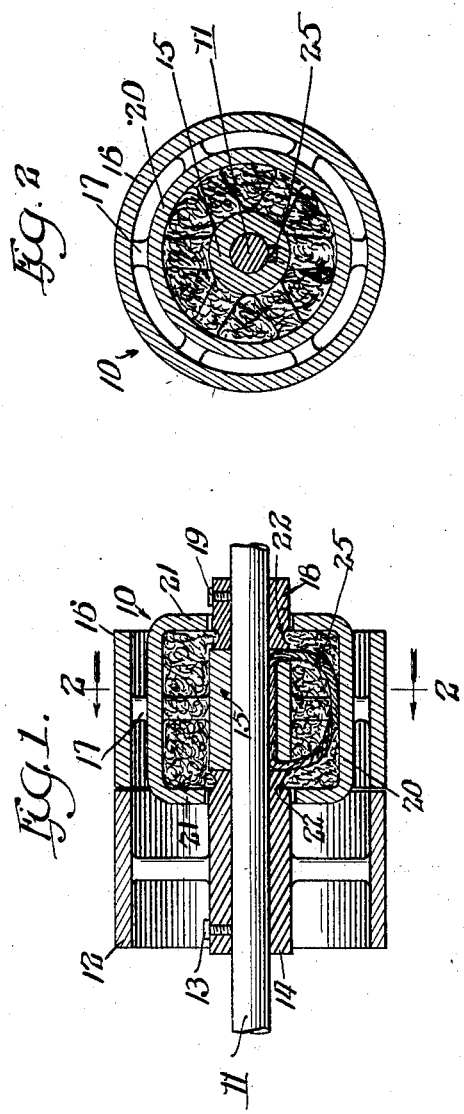
Witnesses:
Inventor
Albert W. Wigglesworth
by Poole & Brown
Attys

UNITED STATES PATENT OFFICE.

ALBERT W. WIGGLESWORTH, OF CHICAGO, ILLINOIS.

SELF-OILING PULLEY.

980,579.  Specification of Letters Patent.  Patented Jan. 3, 1911.

Application filed July 13, 1908. Serial No. 443,193.

*To all whom it may concern:*

Be it known that I, ALBERT W. WIGGLESWORTH, a citizen of the United States, and a resident of Chicago, in the county of Cook and State of Illinois, have invented certain new and useful Improvements in Self-Oiling Pulleys; and I do hereby declare that the following is a full, clear, and exact description thereof, reference being had to the accompanying drawings, and to the letters of reference marked thereon, which form a part of this specification.

This invention relates to improvements in self oiling pulleys and the object of the invention is to provide an inexpensive and simple pulley having a chamber for retaining a lubricant which is applied to the pulley shaft as required, said chamber being arranged to prevent waste of the lubricant therefrom.

The invention consists in the matters hereinafter set forth and more particularly pointed out in the appended claim.

In the drawings:—Figure 1 is a longitudinal sectional view of a fast and loose pulley, and the shaft thereof, showing a loose pulley embracing my invention. Fig. 2 is a cross-section taken on line 2—2 of Fig. 1. Fig. 3 is a longitudinal sectional view of a fast and loose pulley, showing my improvements applied to another form of loose pulley. Fig. 4 is a cross-section taken on line 4—4 of Fig. 3.

As shown in Figs. 1 and 2 of the drawings, 10 designates a loose pulley rotatably mounted on a shaft 11, and 12 designates a fixed pulley on said shaft, said pulley being fixed to said shaft by a set screw 13 extending through the hub 14 of the fast pulley and impinging on the shaft. The said loose pulley 10 comprises a central hub 15, a rim 16, and radial connecting arms or spokes 17, said parts being made integral with each other. The hub of the loose pulley is mounted between the hub 14 of the tight pulley and a collar 18 which is fixed to the shaft 11, as by means of a set screw 19. Said loose pulley is provided with an oil chamber, the walls of which are made an integral part of the wheel structure. The said oil chamber, in the present instance, extends entirely around the hub of the pulley and comprises an outer circular wall 20, made integral with the spokes or arms 17 of the loose pulley, and radial end walls 21, 21 which are centrally apertured for the passage of the shaft therethrough. The end walls of the oil chamber are located longitudinally exterior to the hub of the pulley and are arranged opposite to parts which are fixed on and rotate with the shaft on each side of the loose pulley hub, to-wit, the hub of the fast pulley and the collar 18, as herein shown. The said parts which rotate with the shaft and which are located at the ends of the loose pulley hub are provided, just inside the end walls 21 of the oil chamber, with annular grooves 22, 22 which prevent any free oil which may drip upon said rotating parts escaping from the chamber, inasmuch as such free oil will not pass the grooved surfaces of the rotating parts. Such grooves may, in some instances, be formed directly in the shaft, and the same results may be produced by annular ribs in place of the grooves when the presence of such ribs is practicable. The said chamber is filled with a suitable medium for retaining the oil therein, as, for instance, a mass of cotton waste or the like. The means herein shown for directing the oil to the surface of the shaft consists of a wick 25 arranged partly in a longitudinal groove in the bore of the pulley hub, and said wick extends through radial notches at the ends of said groove into the oil chamber. Said wick lies against the shaft and acts by capillary attraction, in a familiar manner, to direct the oil from the chamber to the surface of the shaft and apply the oil to the shaft.

It will be observed that the walls of the chamber constitute integral parts of the pulley structure. Thus my improvements may be inexpensively applied to a pulley inasmuch as the pulley and chamber are cast in one piece and no assembling and fitting of parts is required. Moreover, by reason of the integrality of the chamber and pulley, the parts constituting the chamber cannot become loosened or displaced so as to interfere with the function of the chamber as a means for retaining a lubricant around the pulley bearing. The wick is threaded into place and the waste or lubricant retaining material is inserted into the chamber through the spaces between the inner annular edges of the end walls 21 and the ends of the pulley hub before the pulley is mounted on the shaft.

The presence of the grooves 22 in the parts rotating with the shaft, or on the shaft itself, located within the end walls of the chamber forms annular depressed surfaces or shoulders which prevent the escape of free oil which may find its way to said rotating parts, the said annular surfaces operating through rotary movement of the part or parts in which they are formed to throw the oil back into the chamber where it is taken up by the waste. So far as is concerned this feature of the invention, the pulley and chamber may be otherwise made.

In Figs. 3 and 4 my invention is shown as applied to a loose pulley 30 wherein the loose pulley 30 is made of such size, relatively, to the lubricating chamber, that the rim 31 of said pulley constitutes the outer wall of the oil chamber. The hub 32 of said loose pulley occupies the same relation to the end walls 33 of the oil chamber as in the previously described construction, said hub terminating a distance inside said walls. In other respects the construction is like that shown in Fig. 2.

It is apparent that I have provided an exceedingly simple, durable and efficient lubricating device for pulleys and one which requires but little attention to keep the same filled with a lubricating material.

I claim as my invention:—

The combination with a shaft, of a fixed and a loose pulley thereon, said loose pulley being provided with an oil chamber which surrounds the hub thereof and the walls of which are made integral with said hub, fibrous material located in said chamber, the end walls of said chamber being extended beyond the ends of the hub and provided with central openings for the passage of the shaft and to form between said hub ends and the end walls of the chamber annular openings into the chamber through which the said fibrous lubricating material may be inserted, a fixed sleeve on said shaft, the hub of said fixed pulley and said fixed sleeve extending through said central openings of said end walls and abutting against the ends of the loose pulley hub to hold the loose pulley in place, and means for conducting the lubricant from the said chamber to the interior bearing surface of the loose pulley hub.

In testimony, that I claim the foregoing as my invention I affix my signature in the presence of two witnesses, this 6th day of July A. D. 1908.

ALBERT W. WIGGLESWORTH.

Witnesses:
W. DITFURTH,
L. L. CARLTON.